Figure 1:
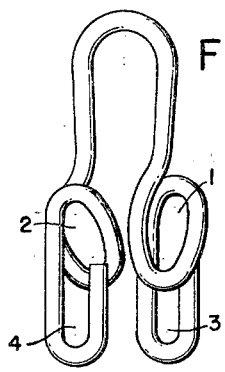

Dec. 25, 1962 J. P. JORGENSON ET AL 3,069,739
CABLE CLAMPS
Filed Dec. 10, 1959

*INVENTORS*
JOHN P. JORGENSON
OLAF E. KLING
BY
*ATTORNEY*

3,069,739
CABLE CLAMPS
John P. Jorgenson, 199 S.E. 24th St., Fort Lauderdale, Fla., and Olaf E. Kling, 200 Betty Lane, Clearwater, Fla.
Filed Dec. 10, 1959, Ser. No. 858,717
1 Claim. (Cl. 24—129)

This invention is directed to a cable clamp.

Currently, the practice of employing steel stranded cables with an extruded jacket of plastic material has become common, particularly for marine applications in which it is desired to preserve the cable from corrosion. The provision of the plastic jacket has made cable clamps of the prior art unsuitable for clamping cables of the type described, primarily because, when the smooth plastic jacket of parallel fetches of cable are in contact with one another or with a clamp surface, such plastic jacket has a tendency to slide against an opposed jacket or clamp surface when the cable is subjected to a withdrawal force, irrespective of the force applied against the fetch of cable. Further, pressure causes the plastic jacket to deform and increases the incapacity of the opposed surfaces to hold against a withdrawal force. The interposition of screws for engagement with the plastic surface to increase clamping pressure is ineffective for like reason. This is in contrast with the friction developed from the strands of unjacketed cables when clamping pressures are applied to them.

An object of this invention, then, is to provide clamping means for cables of the character described which will permit fixedly clamping one end of a cable into a clamp.

Another object of the invention is to provide clamping means for cables having smooth plastic jackets which will permit an end of the cable to be fixedly retained within a clamping member irrespective of the withdrawal force applied to it.

A still further object of the invention is to provide a clamping means for plastic jacketed cables which will fixedly hold them against withdrawal forces, for example when two cables are joined by interlooping, splicing being impracticable in cables of this type.

A still further object of the invention is to provide a simple, low-cost clamp for plastic jacketed cables of the type described, into which the cable may be inserted with a minimum of effort and fixedly held against the withdrawal forces experienced in normal usage.

In the prior art for clamping unjacketed cables, the practice has been to provide tools to apply clamping pressure and deform the clamp member after the cables have been inserted in the clamp, utilizing the forces created by the deformation by the clamp to develop the necessary pressures. While our invention has been directed primarily to providing means adequate for permanently clamping the plastic jacketed types of cables described, it is obvious that it is equally usable with unjacketed stranded cables. When the cables are inserted in the manner hereinafter described, firm clamping is effected without the use of any clamping tools or any deforming of the clamping member.

Referring now to the appended drawings, in describing the convolutions of the cables within the clamp, we use the term "fetch" to designate the length of cable between bends. The "terminal fetch" is that defined between the end of the cable and the first bend; the "secondary fetch" is that length of cable between the first and second bend; the "tertiary fetch" is that length of cable after the second bend. In some clamping arrangements it may be desirable to provide a fourth or "quaternary" fetch.

In designating the several fetches of cable where they are shown in section in the drawings, we use the following conventions:

The terminal fetch is hatched at minus 45°, relative to the top of the drawing; the secondary fetch is hatched at plus 45° relative to the top of the drawing; the tertiary fetch has horizontal hatching; where there is a quaternary fetch, it is vertically hatched.

Referring now generally to the drawings, we show three different types of our clamp of wholly different mechanical configuration. However, analysis of the function of these various arrangements will show that they are nevertheless topological equivalents, as will later be more particularly pointed out.

Figure 2:
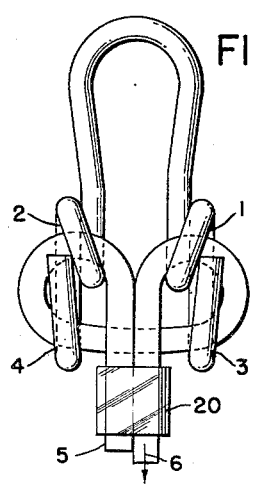

In the drawings, FIG. 1 is a perspective view of the preferred form of our clamp before the insertion of a cable. FIG. 2 is an elevational view of the clamp of FIG. 1 with a cable inserted in clamped position.

Figure 3:
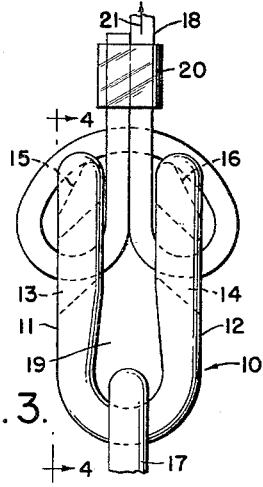
Figure 4:
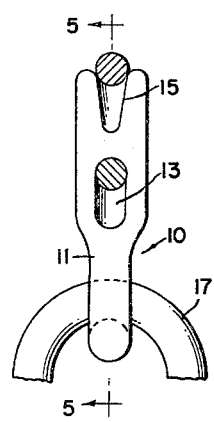
Figure 5:
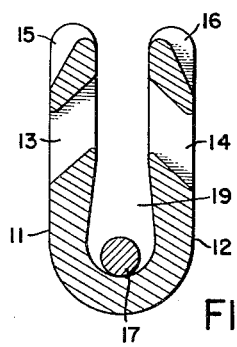

FIG. 3 is a front elevational view of another form of our clamp, showing a cable inserted and under clamping pressure, with the clamp body engaging a ring or eye, partly broken away. FIG. 4 is a side elevational view taken from the direction 4—4 of FIG. 3, with the fetches of cable being shown in section, hatched in accordance with the described convention. FIG. 5 is a sectional view of the clamp, the cable not being shown, taken on the plane 5—5 of FIG. 4.

Figure 6:
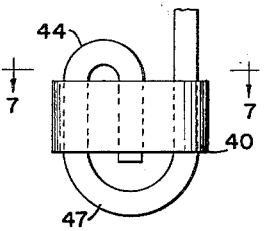
Figure 7:
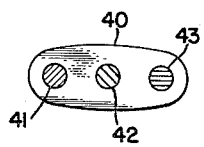

FIG. 6 is a plan view of an alternative type of our clamp, showing a cable inserted and under clamping pressure. FIG. 7 is a front elevational view from the direction 7—7 of FIG. 6, with the fetches of cable being shown in section, hatched in accordance with the described convention.

Figure 8:
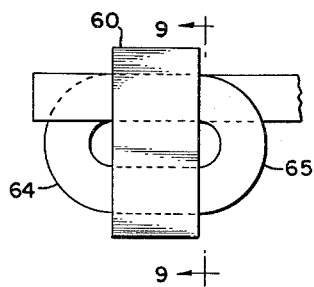
Figure 9:
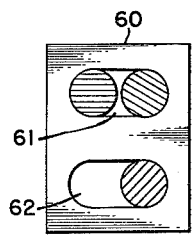
Figure 10:
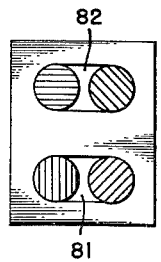

FIG. 8 is a side elevational view of a still further form of our clamp, showing a cable inserted and under pressure. FIG. 9 is a front elevational view from the direction 9—9 of FIG. 8, with the fetches of cable being shown in section, hatched in accordance with the described convention. FIG. 10 is a diagrammatic layout of the form of clamp of FIG. 8 showing four fetches of cable inserted, hatched in accordance with the described convention.

Referring now particularly to FIG. 1, the preferred form of our clamp takes the form of an inverted U, as shown, of heavy wire—No. 8 gauge is adequate for a three-eighths inch cable—having a pair of spaced, complementary primary loops 1, 2 at 90° to the general plane of the U, and a pair of spaced complementary secondary loops 3, 4 disposed below the loops 1, 2 in the same general plane so far as may be consonant with the looping of the wire.

The method of insertion of the cable for clamping is shown in plan in FIG. 2. The end 5 of the cable to be clamped is first inserted through either of the loops 1, 2, loop 1 in the drawing, then drawn through the juxtaposed loop 3, then through loop 3's complementary secondary loop 4, then through the open primary loop 2, then being drawn down parallel to the length of the cable leading to the first primary loop 1. The end 5, passing through the loop 2 comprises the terminal fetch; the portion passing through the loops 3, 4, the secondary fetch; the balance being the tertiary fetch in the parlance of this specification.

When tension is supplied in the direction of the arrow 6, FIG. 2, the cable will be drawn up tightly within the clamp, and it will hold the convoluted fetches of the cable tight against any ordinary strain to which the cable may be subjected without failure. When the device has been applied to severe tests, the experience is that the cable will break before it will withdraw from the clamp.

In the topology of FIGS. 1–2, loop 2 comprises a first cable confining region, loops 4, 3 a second cable confining region, and loop 1, a third cable confining region.

Referring now to FIG. 3, this form of our clamp comprises a U-shaped body member 10, having two diagonally disposed cable receiving openings, 13, 14, see FIG. 5, through the arms 11, 12 thereof. At the ends of each of the arms 11, 12 are open grooved portions, 15, 16. Openings 13, 14 and grooves 15, 16 have equivalent diameters, as shown, adapted to receive a cable of the size and type described. At the base of the body member 10 clearance is provided for a ring, hook, or eye, 17, shown broken away in the drawings FIGS. 3, 4. In practice, we have made the body member out of such corrosion resistant alloys as bronze; equally, it may be made of a tough durable plastic such as nylon.

The procedure for assembling a cable for clamping in the type of clamp shown in FIGS. 3 to 5 is as follows: a length of cable 18 is fed through the gap 19 of the U and through the opening 14. It is then bent across the grooves 16, 15 and fed through the opening 13. The stub of the terminal fetch is drawn down parallel to the length 18 and a sleeve 20 may be drawn thereover, as shown. When tension is applied in the direction of the arrow 21, FIG. 3, the cable will be drawn up tightly within the clamp, and it will hold the convoluted fetches of the cable tight against any strain to which the cable may be subjected, without failure.

In the topology of FIGS. 3–5, opening 13 comprises a first cable confining region, grooves 15, 16 a second cable confining region, and opening 14 a third cable confining region.

While considerable tolerance is permissible in the location of the axes of the loops 1, 2 and 3, 4, FIGS. 1–2, and the openings 13, 14 and the grooves 15, 16 of the type of clamp shown in FIGS. 3 to 5 in their positional relation to one another, and such dimensional relationships will within limits permit effective clamping of cables of various sizes, the optimum dimensional relationship requires that the radius of bend between the terminal and secondary fetches be not more than approximately three times the diameter of the inserted cable. It is obvious, of course, that the less the radius of bend between the terminal and secondary fetches of cable in relation to the cable diameter, the more efficacious is the clamping effect. The radius of bend between the secondary and tertiary fetches is not critical but will assume a normal relationship defined by the vector of the withdrawal force, arrow 21, and the location, usually permanent, of the ring 17.

Referring now to FIGS. 6, 7, this form of our clamp comprises a body member 40 having therethrough at least three cable receiving openings, 41, 42, 43, in FIG. 7, the width of the body member 40, or the depth of the openings 41–43, being short relative to the length of the body. The spacing between centers of the openings 41—43 is such that it should be no more than three times the diameter of the maximum size of cable it is adapted to receive, as shown at 44, FIG. 6.

In assembling the cable in the body member 40 for clamping, as a matter of convenience, a cable is inserted through the opening that will ultimately accommodate the tertiary fetch, 43 in FIG. 7; then it is looped through the opening 41 in FIG. 7, to determine the secondary fetch, the end, or terminal fetch, being inserted in the central of the three openings, 42, in FIG. 7. The cable between the terminal and secondary fetches is then pulled up as tightly as possible to define the shortest practicable radius between the terminal and secondary fetches, as shown at 44 in FIG. 6.

In the topology of FIGS. 6–7, opening 42 comprises a first cable confining region, opening 41 a second cable confining region, and opening 43 a third cable confining region.

The loop 47 between the secondary and tertiary fetches may be as long as required to engage a hook or eye, or be spaced by a thimble, none of these devices being shown in the drawings, but all being well known in the art. Equally, it is obvious that a pair of cables may be coupled by interlocking the loops between the secondary and tertiary fetches on each of the pairs during assembly. Similar practices may be followed with unjacketed cables where the clamp is used with cables of these types.

While we have not shown it in the drawings, it is obvious that the openings of FIG. 7 may be so arranged that the axis of each is located at the point of a small equilateral triangle, with a triangular body member, the spacing between the axes of contiguous openings being no more than three times the diameter of the maximum size of cable for which the clamp is designed.

In the clamp of the type of FIG. 7, the dimensions of the clamp body may be enlarged to provide for six instead of three openings, thus providing dual clamping means. Such a structure may be employed as a coupling for two cables, the end of one of the cables being clamped in one of the sets of three openings, as described, and the second cable, inserted from an opposite direction, clamped in the other set of openings. Such a structure may be further used to provide a loop of fixed dimension, by inserting a cable, in clamping configuration, in one of the sets of three openings at a desired distance from its end, then clamping the free end in the other set of three openings to form the loop.

An alternative type of clamp which affords some facility in assembly is shown in FIGS. 8 and 9, in which the openings in the body member 60 are elongate slots, 61 and 62, FIG. 9, adapted to receive two fetches of cable. The length of the slots need be no more than adequate to accommodate the diameter of two cables, with minimum clearance, the spacing between the long dimensions of the slots 61, 62 being similar to that between the openings 41, 42 in FIG. 7.

In assembling a cable to the clamp as shown in FIG. 8, the loop 64 between the secondary and tertiary fetches may be inserted through slot 62, FIG. 9, the fetches being parallel to one another, and the terminal fetch then being inserted through slot 61, the cable then being drawn to a minimum radius at 65 between slots 62 and 61, the loop 64 between the secondary and tertiary fetches being left as long as desired. If desired, two clamping loops may be provided in the clamp shown in FIG. 9, the detail being shown diagrammatically in FIG. 10 through the hatching convention of this specification, with the tertiary fetch being crossed over to be received in slot 82 next the terminal fetch, and the quaternary fetch with the desired loop being accommodated in slot 81 in parallel with the secondary fetch.

It will be seen from the foregoing description that we have provided a simple, low-cost means of clamping or coupling cables of the character described. Numerous variants of our invention will undoubtedly occur to those skilled in the art and are to be construed within the scope of the claim hereto appended.

Having fully described our invention, we claim:

A cable clamp comprising
 a. a first cable confining region, sized to pass a terminal fetch of cable,
 b. a second cable confining region
  I. in juxtaposition to said first cable confining region,
  II. likewise sized to pass a secondary fetch of cable, and
  III. so positioned in respect of said first-mentioned region that a bend between a terminal and a secondary fetch of cable confined in said regions must traverse an arc of at least 180 degrees, said arc having a radius of not more than approximately three times the diameter of an inserted cable, and
 c. a third cable confining region,
  I. adapted to pass a tertiary fetch of cable,
  II. bent against a secondary fetch, d. the location of said first and third cable confining regions being such that
  I. terminal and tertiary fetches of cable laid therein will be parallel to one another, and
  II. the length of each of said cable confining regions in substantially longer than the diameter of the cable to be clamped,
e. the clamp member being formed of a U-shaped casting,
  I. having an opening in each arm of the U,
    (a') one of said openings serving as said first cable confining region, and
    (b') the other of said openings serving as said third cable confining region,
  II. the outer ends of each arm being notched to provide conjointly said second cable confining region,
f. the spacing between said arms of said U being such that minimum clearance is provided for terminal and tertiary fetches of cable laid juxtaposed therein.

References Cited in the file of this patent

UNITED STATES PATENTS

| | | |
|---|---|---|
| 262,653 | Ducker | Aug. 15, 1882 |
| 304,840 | McIver | Sept. 9, 1884 |
| 653,661 | Conger | July 17, 1900 |
| 1,083,958 | Tod | Jan. 13, 1914 |
| 1,322,168 | Hanner et al. | Nov. 18, 1919 |
| 1,402,592 | Garvey | Jan. 3, 1922 |
| 1,504,234 | Green | Aug. 12, 1924 |
| 2,619,696 | Scott | Dec. 2, 1952 |

FOREIGN PATENTS

| | | |
|---|---|---|
| 570,769 | Canada | Feb. 17, 1959 |
| 575,601 | Canada | May 12, 1959 |
| 1,030,833 | France | Mar. 18, 1953 |
| 515,024 | Great Britain | Nov. 23, 1939 |
| 350,716 | Italy | July 20, 1937 |